US006962258B2

(12) United States Patent
Zha et al.

(10) Patent No.: US 6,962,258 B2

(45) **Date of Patent: *Nov. 8, 2005**

(54) HOLLOW FIBER RESTRAINING SYSTEM

(75) Inventors: Fufang Zha, West Ryde (AU); David John Cox, Penrith (AU)

(73) Assignee: U.S. Filter Wastewater Group, Inc., Warrendale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/894,191

(22) Filed: Jul. 19, 2004

(65) Prior Publication Data

US 2004/0262215 A1 Dec. 30, 2004

Related U.S. Application Data

(63) Continuation of application No. 10/268,600, filed on Oct. 9, 2002, now Pat. No. 6,783,008, which is a continuation of application No. PCT/AU01/00387, filed on Apr. 6, 2001.

(30) Foreign Application Priority Data

Apr. 10, 2000 (AU) .............................................. PQ6801

(51) Int. Cl.[7] ................................................ B01D 35/30

(52) U.S. Cl. .................. 210/485; 210/321.88; 210/483; 210/232

(58) Field of Search ................................ 210/483–486, 210/488, 495, 497.01, 497.1, 500.22, 321.88, 321.89, 232

(56) References Cited

U.S. PATENT DOCUMENTS

| | | | |
|---|---|---|---|
| 3,228,876 A | | 1/1966 | Mahon |
| 3,693,406 A | | 9/1972 | Tobin |
| 3,708,071 A | | 1/1973 | Crowley |
| 3,804,258 A | * | 4/1974 | Okuniewski et al. ....... 210/460 |
| 3,968,192 A | | 7/1976 | Hoffman et al. |
| 3,992,301 A | | 11/1976 | Shippey et al. |
| 4,188,817 A | | 2/1980 | Steigelmann |
| 4,192,750 A | | 3/1980 | Elfes et al. |

(Continued)

FOREIGN PATENT DOCUMENTS

| | | |
|---|---|---|
| DE | 3904544 A | 8/1990 |
| DE | 4117281 A | 1/1992 |
| DE | 4117422 A | 11/1992 |

(Continued)

OTHER PUBLICATIONS

International Search Report in Corresponding PCT Application No. PCT/AU01/00387.

Supplementary EPO Search Report in EP 01 91 9003 mailed on Apr. 16, 2003.

Almulla et al., Desalination 153 (2002) 237–243.

Rosenberger et al., Desalination 151 (2002) 195–200.

Cote et al., Wat. Sci. Tech. 38(4–5) (1998) 437–442.

White, et al., The Chemical Engineering Journal, 52 (1993) 73–77.

Husain, H. et al., "The ZENON experience with membrane bioreactors for municipal wastewater treatment", MBR2: Membr. Bioreact. Wastewater Treat., 2nd Intl. Meeting; School of Water Sciences, Cranfield University, Cranfield, UK, Jun. 1999.

*Primary Examiner*—W. L. Walker
*Assistant Examiner*—Krishnan S Menon

(57) ABSTRACT

A restraining system for hollow fibers is provided. The restraining system includes a plurality of longitudinally extending elements spaced from one another and supported by a number of discrete spacer elements, each spacer element extending generally transverse of said longitudinal elements, such that in combination with said longitudinal elements they define a cage-like structure.

32 Claims, 6 Drawing Sheets

U.S. PATENT DOCUMENTS

| | | | | |
|---|---|---|---|---|
| 4,193,780 | A | 3/1980 | Cotton et al. | |
| 4,218,324 | A | 8/1980 | Hartmann et al. | |
| 4,248,648 | A | 2/1981 | Kopp | |
| 4,353,802 | A | 10/1982 | Hara et al. | |
| 4,384,474 | A | 5/1983 | Kowalski | |
| 4,385,150 | A | 5/1983 | Miyake et al. | |
| 4,451,369 | A | 5/1984 | Sekino et al. | |
| 4,511,471 | A | 4/1985 | Müller | |
| 4,540,490 | A | 9/1985 | Shibata et al. | |
| 4,547,289 | A | 10/1985 | Okano et al. | |
| 4,609,465 | A | 9/1986 | Miller | |
| 4,614,109 | A | 9/1986 | Hoffmann | |
| 4,632,745 | A | 12/1986 | Giuffrida et al. | |
| 4,636,296 | A | 1/1987 | Kunz | |
| 4,642,182 | A * | 2/1987 | Drori | 210/232 |
| 4,647,377 | A | 3/1987 | Miura | |
| 4,650,586 | A | 3/1987 | Ellis | |
| 4,656,865 | A | 4/1987 | Callan | |
| 4,660,411 | A | 4/1987 | Reid | |
| 4,670,145 | A | 6/1987 | Edwards | |
| 4,673,507 | A | 6/1987 | Brown | |
| 4,687,561 | A | 8/1987 | Kunz | |
| 4,687,578 | A | 8/1987 | Stookey | |
| 4,688,511 | A | 8/1987 | Gerlach et al. | |
| 4,718,270 | A | 1/1988 | Storr | |
| 4,744,240 | A | 5/1988 | Reichelt | |
| 4,756,875 | A | 7/1988 | Tajima et al. | |
| 4,763,612 | A | 8/1988 | Iwanami | |
| 4,767,539 | A | 8/1988 | Ford | |
| 4,779,448 | A | 10/1988 | Gogins | |
| 4,784,771 | A | 11/1988 | Wathen et al. | |
| 4,793,932 | A | 12/1988 | Ford et al. | |
| 4,797,211 | A | 1/1989 | Ehrfeld et al. | |
| 4,810,384 | A | 3/1989 | Fabre | |
| 4,812,235 | A | 3/1989 | Seleman et al. | |
| 4,816,160 | A | 3/1989 | Ford et al. | |
| 4,846,970 | A | 7/1989 | Bertelsen et al. | |
| 4,876,006 | A * | 10/1989 | Ohkubo et al. | 210/321.69 |
| 4,876,012 | A | 10/1989 | Kopp et al. | |
| 4,921,610 | A | 5/1990 | Ford et al. | |
| 4,931,186 | A | 6/1990 | Ford et al. | |
| 4,935,143 | A | 6/1990 | Kopp et al. | |
| 4,969,997 | A | 11/1990 | Kluver et al. | |
| 4,999,038 | A * | 3/1991 | Lundberg | 55/491 |
| 5,005,430 | A | 4/1991 | Kibler et al. | |
| 5,024,762 | A | 6/1991 | Ford et al. | |
| 5,066,375 | A | 11/1991 | Parsi et al. | |
| 5,066,401 | A | 11/1991 | Muller et al. | |
| 5,066,402 | A | 11/1991 | Anselme et al. | |
| 5,069,065 | A | 12/1991 | Sprunt et al. | |
| 5,076,925 | A | 12/1991 | Roesink et al. | |
| 5,079,272 | A | 1/1992 | Allegrezza et al. | |
| 5,094,750 | A | 3/1992 | Kopp et al. | |
| 5,104,535 | A | 4/1992 | Cote et al. | |
| 5,104,546 | A | 4/1992 | Filson et al. | |
| 5,137,631 | A | 8/1992 | Eckman et al. | |
| 5,138,870 | A | 8/1992 | Lyssy | |
| 5,151,191 | A | 9/1992 | Sunaoka et al. | |
| 5,151,193 | A | 9/1992 | Grobe et al. | |
| 5,158,721 | A | 10/1992 | Allegrezza et al. | |
| 5,182,019 | A | 1/1993 | Cote et al. | |
| 5,192,456 | A | 3/1993 | Ishida et al. | |
| 5,192,478 | A | 3/1993 | Caskey | |
| 5,194,149 | A | 3/1993 | Selbie et al. | |
| 5,198,116 | A | 3/1993 | Comstock et al. | |
| 5,209,852 | A | 5/1993 | Sunaoka et al. | |
| 5,211,823 | A | 5/1993 | Giuffrida et al. | |
| 5,221,478 | A | 6/1993 | Dhingra et al. | |
| 5,227,063 | A | 7/1993 | Langerak et al. | |
| 5,248,424 | A | 9/1993 | Cote et al. | |
| 5,271,830 | A | 12/1993 | Falvre et al. | |
| 5,297,420 | A | 3/1994 | Gilliland et al. | |
| 5,320,760 | A | 6/1994 | Freund et al. | |
| 5,353,630 | A | 10/1994 | Soda et al. | |
| 5,361,625 | A | 11/1994 | Ylvisaker | |
| 5,364,527 | A | 11/1994 | Zimmermann et al. | |
| 5,389,260 | A | 2/1995 | Hemp et al. | |
| 5,393,433 | A | 2/1995 | Espenan et al. | |
| 5,401,401 | A | 3/1995 | Hickok et al. | |
| 5,403,479 | A | 4/1995 | Smith et al. | |
| 5,405,528 | A | 4/1995 | Selbie et al. | |
| 5,417,101 | A | 5/1995 | Weich | |
| 5,419,816 | A | 5/1995 | Sampson et al. | |
| 5,470,469 | A | 11/1995 | Eckman | |
| 5,477,731 | A | 12/1995 | Mouton | |
| 5,480,553 | A | 1/1996 | Yamamori et al. | |
| 5,531,848 | A | 7/1996 | Brinda et al. | |
| 5,531,900 | A | 7/1996 | Raghavan et al. | |
| 5,543,002 | A | 8/1996 | Brinda et al. | |
| 5,554,283 | A | 9/1996 | Brinda et al. | |
| 5,607,593 | A | 3/1997 | Cote et al. | |
| 5,639,373 | A | 6/1997 | Mahendran et al. | |
| 5,643,455 | A | 7/1997 | Kopp et al. | |
| 5,677,360 | A | 10/1997 | Yamamori et al. | |
| D396,046 | S | 7/1998 | Scheel et al. | |
| 5,783,083 | A | 7/1998 | Henshaw et al. | |
| D396,726 | S | 8/1998 | Sadr et al. | |
| D400,890 | S | 11/1998 | Gambardella | |
| 5,906,742 | A | 5/1999 | Wang et al. | |
| 5,910,250 | A | 6/1999 | Mahendran et al. | |
| 5,914,039 | A | 6/1999 | Mahendran | |
| 5,918,264 | A | 6/1999 | Drummond et al. | |
| 5,942,113 | A | 8/1999 | Morimura | |
| 5,944,997 | A | 8/1999 | Pedersen et al. | |
| 6,024,872 | A | 2/2000 | Mahendran et al. | |
| 6,039,872 | A | 3/2000 | Wu et al. | |
| 6,042,677 | A | 3/2000 | Mahendran et al. | |
| 6,048,454 | A | 4/2000 | Jenkins | |
| 6,077,435 | A | 6/2000 | Beck et al. | |
| 6,083,393 | A | 7/2000 | Wu et al. | |
| 6,146,747 | A | 11/2000 | Wang et al. | |
| 6,156,200 | A | 12/2000 | Zha et al. | |
| 6,159,373 | A | 12/2000 | Beck et al. | |
| 6,193,890 | B1 | 2/2001 | Pederson et al. | |
| 6,202,475 | B1 | 3/2001 | Selbie et al. | |
| 6,221,247 | B1 | 4/2001 | Nemser et al. | |
| 6,245,239 | B1 | 6/2001 | Cote et al. | |
| 6,254,773 | B1 | 7/2001 | Biltoft | |
| 6,264,839 | B1 | 7/2001 | Mohr et al. | |
| 6,294,039 | B1 | 9/2001 | Mahendran et al. | |
| 6,303,035 | B1 | 10/2001 | Cote et al. | |
| RE37,549 | E | 2/2002 | Mahendran et al. | |
| 6,354,444 | B1 | 3/2002 | Mahendran | |
| 6,440,303 | B2 | 8/2002 | Spriegel | |
| D462,699 | S | 9/2002 | Johnson et al. | |
| 6,524,481 | B2 | 2/2003 | Zha et al. | |
| 6,550,747 | B2 | 4/2003 | Rabie et al. | |
| 6,555,005 | B1 | 4/2003 | Zha et al. | |
| D478,913 | S | 8/2003 | Johnson et al. | |
| 6,620,319 | B2 | 9/2003 | Behmann et al. | |
| 6,641,733 | B2 | 11/2003 | Zha et al. | |
| 6,645,374 | B2 | 11/2003 | Cote et al. | |
| 6,783,008 | B2 | 8/2004 | Zha et al. | |
| 6,821,420 | B2 | 11/2004 | Zha et al. | |
| 2001/0027951 | A1 | 10/2001 | Gungerich et al. | |
| 2002/0148767 | A1 | 10/2002 | Johnson et al. | |
| 2002/0153299 | A1 | 10/2002 | Mahendran et al. | |
| 2002/0195390 | A1 | 12/2002 | Zha et al. | |
| 2003/0136746 | A1 | 7/2003 | Behman et al. | |
| 2003/0141248 | A1 | 7/2003 | Mahendran et al. | |

| | | | |
|---|---|---|---|
| 2003/0164332 | A1 | 9/2003 | Mahendran et al. |
| 2003/0178365 | A1 | 9/2003 | Zha et al. |
| 2003/0226797 | A1 | 12/2003 | Phelps |
| 2003/0234221 | A1 | 12/2003 | Johnson et al. |
| 2004/0000520 | A1 | 1/2004 | Gallagher et al. |
| 2004/0035782 | A1 | 2/2004 | Muller |
| 2004/0168979 | A1 | 9/2004 | Zha et al. |
| 2004/0178154 | A1 | 9/2004 | Zha et al. |
| 2004/0191894 | A1 | 9/2004 | Muller et al. |
| 2004/0217053 | A1 | 11/2004 | Zha et al. |
| 2004/0232076 | A1 | 11/2004 | Zha et al. |
| 2004/0238431 | A1 | 12/2004 | Johnson et al. |
| 2004/0238442 | A1 | 12/2004 | Johnson et al. |

FOREIGN PATENT DOCUMENTS

| | | | |
|---|---|---|---|
| EP | 1052012 | A1 | 11/1900 |
| EP | 50447 | A | 10/1985 |
| EP | 250337 | A1 | 12/1987 |
| EP | 327025 | A | 8/1989 |
| EP | 407900 | A2 | 1/1991 |
| EP | 463627 | B1 | 1/1992 |
| EP | 395133 | A1 | 2/1995 |
| EP | 430082 | A2 | 6/1996 |
| EP | 763758 | A1 | 10/1996 |
| EP | 911073 | A1 | 4/1999 |
| EP | 920904 | A1 | 6/1999 |
| EP | 1350555 | A1 | 10/2003 |
| FR | 2620712 | A1 | 3/1989 |
| FR | 2674448 | A1 | 2/1992 |
| GB | 2253572 | A | 9/1992 |
| JP | 58-088007 | A2 | 5/1983 |
| JP | 61-097006 | A2 | 5/1986 |
| JP | 61-107905 | A2 | 5/1986 |
| JP | 61-192309 | A2 | 8/1986 |
| JP | 61-257203 | A2 | 11/1986 |
| JP | 61-263605 | A2 | 11/1986 |
| JP | 62-004408 | A2 | 1/1987 |
| JP | 62-114609 | A2 | 5/1987 |
| JP | 62-140607 | A2 | 6/1987 |
| JP | 62-179540 | A2 | 8/1987 |
| JP | 63-097634 | A2 | 4/1988 |
| JP | 01-307409 | A2 | 12/1989 |
| JP | 21-44132 | A2 | 6/1990 |
| JP | 02-164423 | A2 | 6/1990 |
| JP | 02-284035 | A2 | 11/1990 |
| JP | 03-018373 | A2 | 1/1991 |
| JP | 03-028797 | A2 | 2/1991 |
| JP | 03-110445 | A2 | 5/1991 |
| JP | 04-310223 | A2 | 11/1992 |
| JP | 05-023557 | A2 | 2/1993 |
| JP | 05-157654 | A2 | 6/1993 |
| JP | 06-071120 | A2 | 3/1994 |
| JP | 06-114240 | A2 | 4/1994 |
| JP | 06-277469 | A | 10/1994 |
| JP | 06-343837 | A2 | 12/1994 |
| JP | 07-000770 | A2 | 1/1995 |
| JP | 07-185268 | A2 | 7/1995 |
| JP | 07-275665 | A2 | 10/1995 |
| JP | 07-303895 | A | 11/1995 |
| JP | 08-010585 | A2 | 1/1996 |
| JP | 09-099227 | A | 4/1997 |
| JP | 09-141063 | A2 | 6/1997 |
| JP | 10-085565 | A | 4/1998 |
| JP | 10-156149 | A2 | 6/1998 |
| JP | 63-143905 | A2 | 6/1998 |
| JP | 11-333265 | | 7/1999 |
| JP | 11-319507 | A | 2/2000 |
| JP | 2001-185220 | | 4/2000 |
| JP | 2000-342932 | A | 12/2002 |
| WO | WO 90/00434 | | 1/1990 |
| WO | WO 93/02779 | | 2/1993 |
| WO | WO 96/07470 | | 3/1996 |
| WO | WO 96/41676 | | 12/1996 |
| WO | WO 98/22204 | | 5/1998 |
| WO | WO 99/01207 | | 1/1999 |
| WO | WO 99/59707 | | 11/1999 |
| WO | WO 01/36075 | | 5/2001 |

* cited by examiner

HOLLOW FIBER RESTRAINING SYSTEM

RELATED APPLICATIONS

This application is a continuation of U.S. application Ser. No. 10/268,600, filed Oct. 9, 2002, now U.S. Pat. No. 6,783,008 which is a continuation, under 35 U.S.C. § 120, of International Patent Application No. PCT/AU01/00387, filed on Apr. 6, 2001 under the Patent Cooperation Treaty (PCT), which was published by the International Bureau in English on Oct. 18, 2001, which designates the United States and which claims the benefit of Australian Provisional Patent Application NO. PQ6801, filed Apr. 10, 2000.

FIELD OF THE INVENTION

The present invention relates to a restraining system for hollow fibres used in membrane filtration systems.

BACKGROUND OF THE INVENTION

A number of different types of restraining systems usually in the form of a welded plastic mesh cage have been used in the past, however, these suffer from lack of rigidity when large apertures are required in the mesh to allow for fluid flows and are difficult to repair should any portion of the mesh be broken during transport, installation or use. While such known restraining systems are cheap and simple to manufacture they suffer from a lack of robustness in many required installations.

The present invention seeks to overcome or at least ameliorate one or more of the disadvantages of the prior art or at least provide the public with a useful alternative.

SUMMARY OF THE INVENTION

According to one aspect, the present invention provides a restraining system for hollow fibres including a plurality of longitudinally extending elements spaced from one another and supported by a number of discrete spacer elements, each spacer element extending generally transverse of said longitudinal elements such that in combination with said longitudinal elements they define a cage-like structure.

For preference, the cage-like structure is tubular. Preferably, the longitudinal elements are rods and the spacer elements are in the form of rings. It will be appreciated that the rings may of any geometric shape and are not limited to a circular shape. Similarly, the tubular structure and rods may be of any geometric cross sectional shape.

In one preferred form, each ring has a number of radially extending engagement formations for releasably engaging an associated rod. The formations may be in the form of part-circular opposed flanges spaced to provide a socket having an interference or snap-fit with the associated rod.

In another preferred form, each ring has a number of radially extending cut-outs spaced around its periphery, each cut-out being sized and shaped to form an interference or snap-fit with an associated rod. Preferably, the internal surface of each ring is bevelled along each internal edge. For further preference, the internal surface of each ring is providing with a cushioning element. Preferably, the cushioning element is formed of a foam material and extends past the length of each ring at both ends so as to overlap the internal edges of each ring.

The spacer elements may be formed from a number of sub-elements which are fixed together in use.

The cut-outs or sockets are preferably equally-spaced around the periphery of the ring.

For preference, the rods have a reduced diameter or width at the location where they engage with an associated spacer. Preferably, the reduced diameter is provided by a circumferential groove or slot.

The components of the system are preferably formed of generally rigid plastics material, typically nylon and acrylonitrile butadiene styrene (ABS). The components can be moulded or machined to the desired configuration. The cut-outs are preferably part circular in cross section with an opening slightly smaller than the diameter to provide for snap-fitting retention of the rods.

BRIEF DESCRIPTION OF THE DRAWINGS

Preferred embodiments of the invention will now be described, by way of example only, with reference to the accompanying drawings, in which.

DETAILED DESCRIPTION OF THE PREFERRED EMBODIMENT

Figures 1, 2:
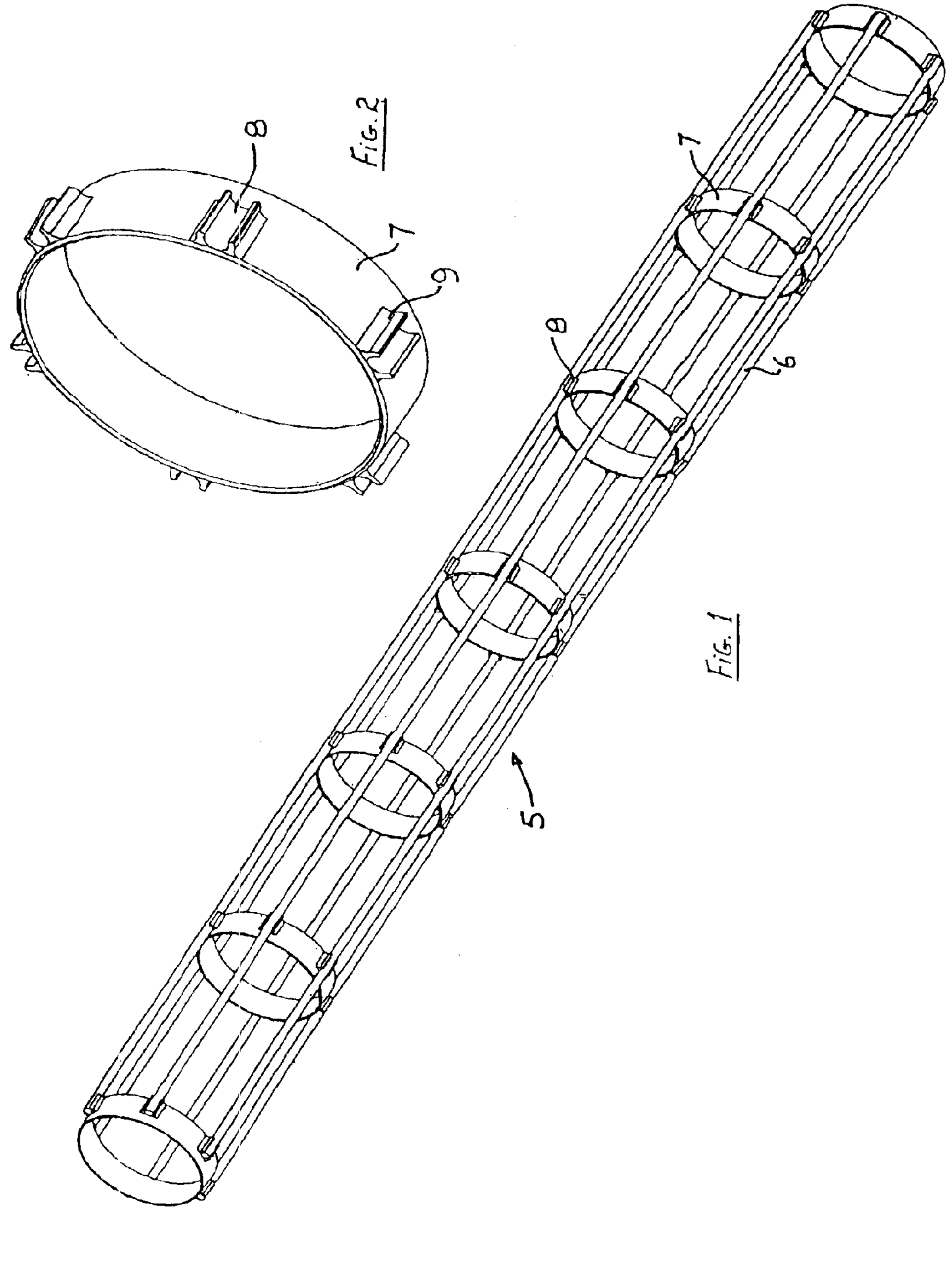
FIG. 1 shows a perspective view of the restraining system according to one embodiment of the invention.
FIG. 2 shows a perspective view of the spacer component of the restraining system of FIG. 1.
Figure 3:
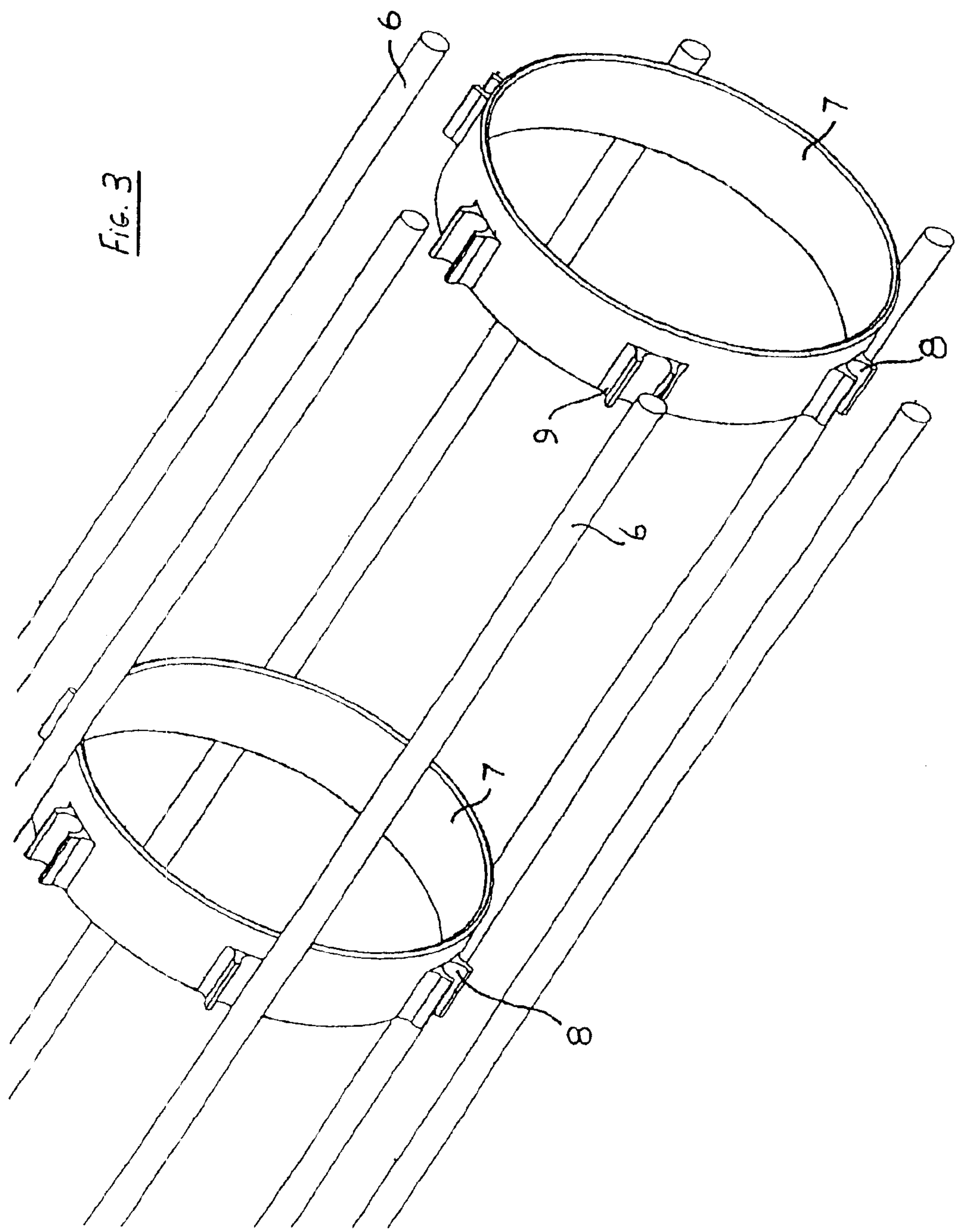
FIG. 3 shows an enlarged exploded perspective view of the restraining system of FIG. 1.
Figures 4, 5, 6:
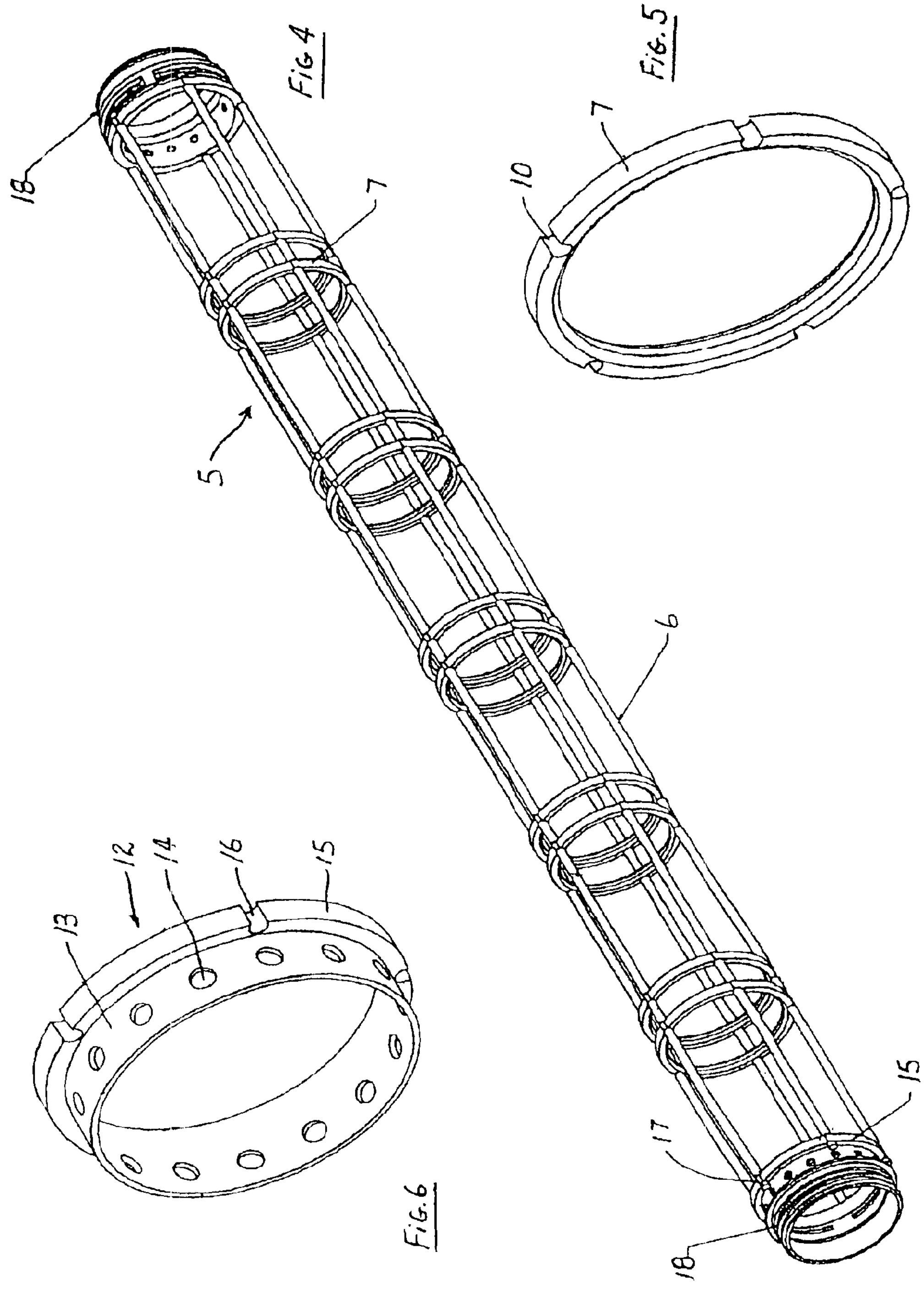
FIG. 4 shows a perspective view of the restraining system according to a second embodiment of the invention.
FIG. 5 shows a perspective view of the snap ring component of the restraining system of FIG. 4.
FIG. 6 shows a perspective view of the adaptor ring component of the restraining system of FIG. 4.
Figures 7, 8, 9:
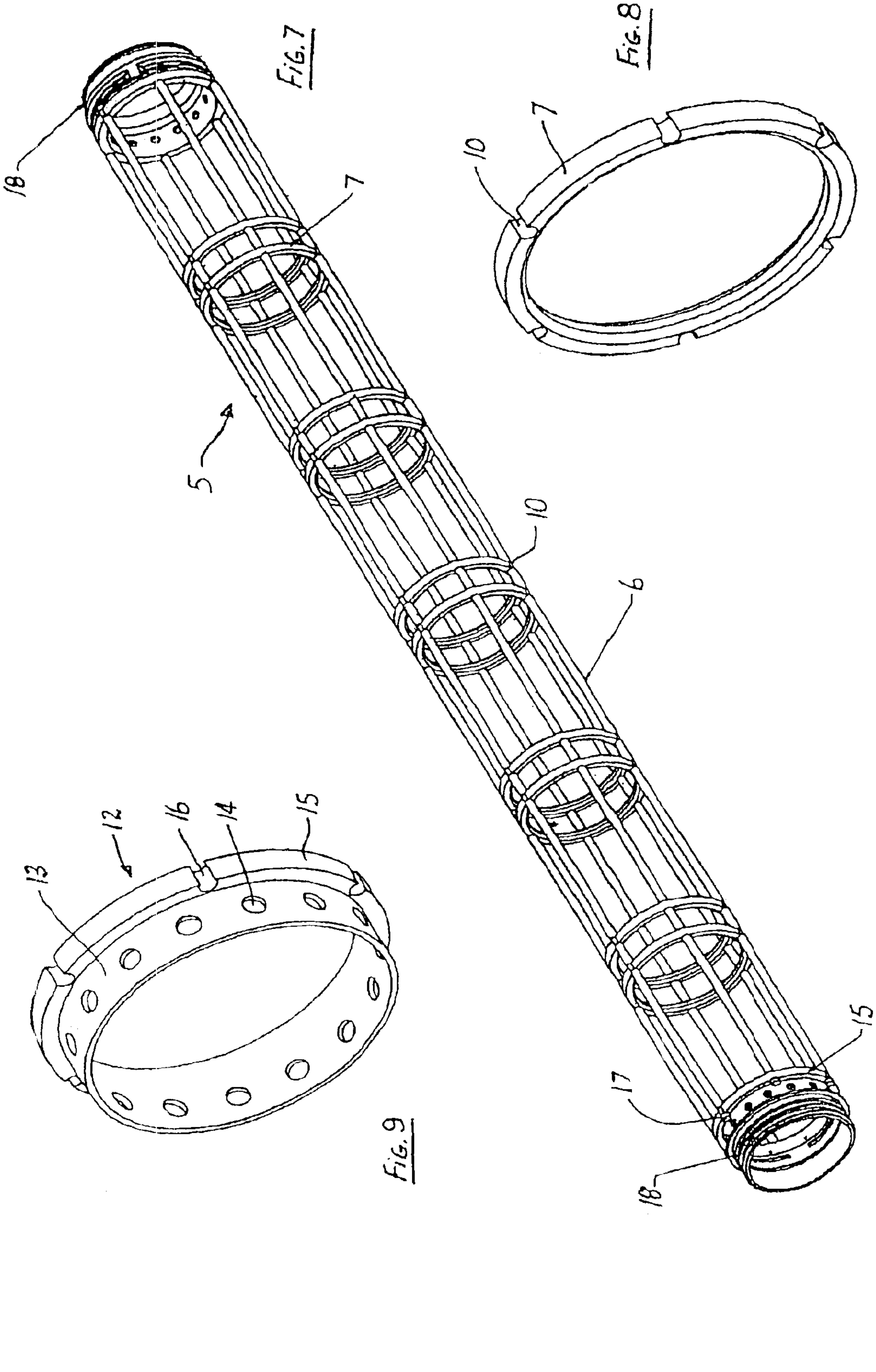
FIG. 7 shows a perspective view of the restraining system according to a third embodiment.
FIG. 8 shows a perspective view of the snap ring component of the restraining system of FIG. 7.
FIG. 9 shows a perspective view of the adaptor ring component of the restraining system of FIG. 7.

Referring to FIGS. 1 to 3, the restraining system comprises a generally tubular cage-like structure 5 formed from a plurality of longitudinally extending rods 6 spaced from one another and held in position by a number of longitudinally spaced and transversely extending spacer rings 7.

Each spacer ring 7 in this embodiment has a number of engagement sockets 8 spaced equally around its periphery. Each socket 8 is formed by part-circular opposed flanges 9 spaced to provide an interference or snap-fit with the associated rod 6. The sockets 8 are slightly over semi-circular in shape to provide retention of the rods 6.

Referring to FIGS. 4 to 13 of the drawings, each ring 7 in these embodiments has a number of radially extending cut-outs 10 equally spaced around its periphery, each cut-out 10 being sized and shaped to form an interference or snap-fit with an associated rod 6. The cut-outs 10 in this embodiment are slightly over semi-circular in shape to provide retention of the rods 6.

The rods 6 in this embodiment are provided with a circumferential groove or slot 11 to provide a reduced diameter/width at the location where they engage with the ring 7. This serves to prevent longitudinal movement of the rings 7 relative to the rods 6.

Each end of the tubular restraining structure 5 is provided with terminating adaptor ring 12 which, in use, mounts the structure 5 to a potting sleeve 16 or the like. The adaptor ring 12 includes a inner ring 13 having a plurality of openings 14 to allow passage of fluid therethrough and a radial extending circumferential rib 15. Rib 15 is again provided with a corresponding number of cut-outs 16 as those provided on the spacer rings 7 for engaging with the ends 17 of rods 6.

Figures 10, 11, 12:
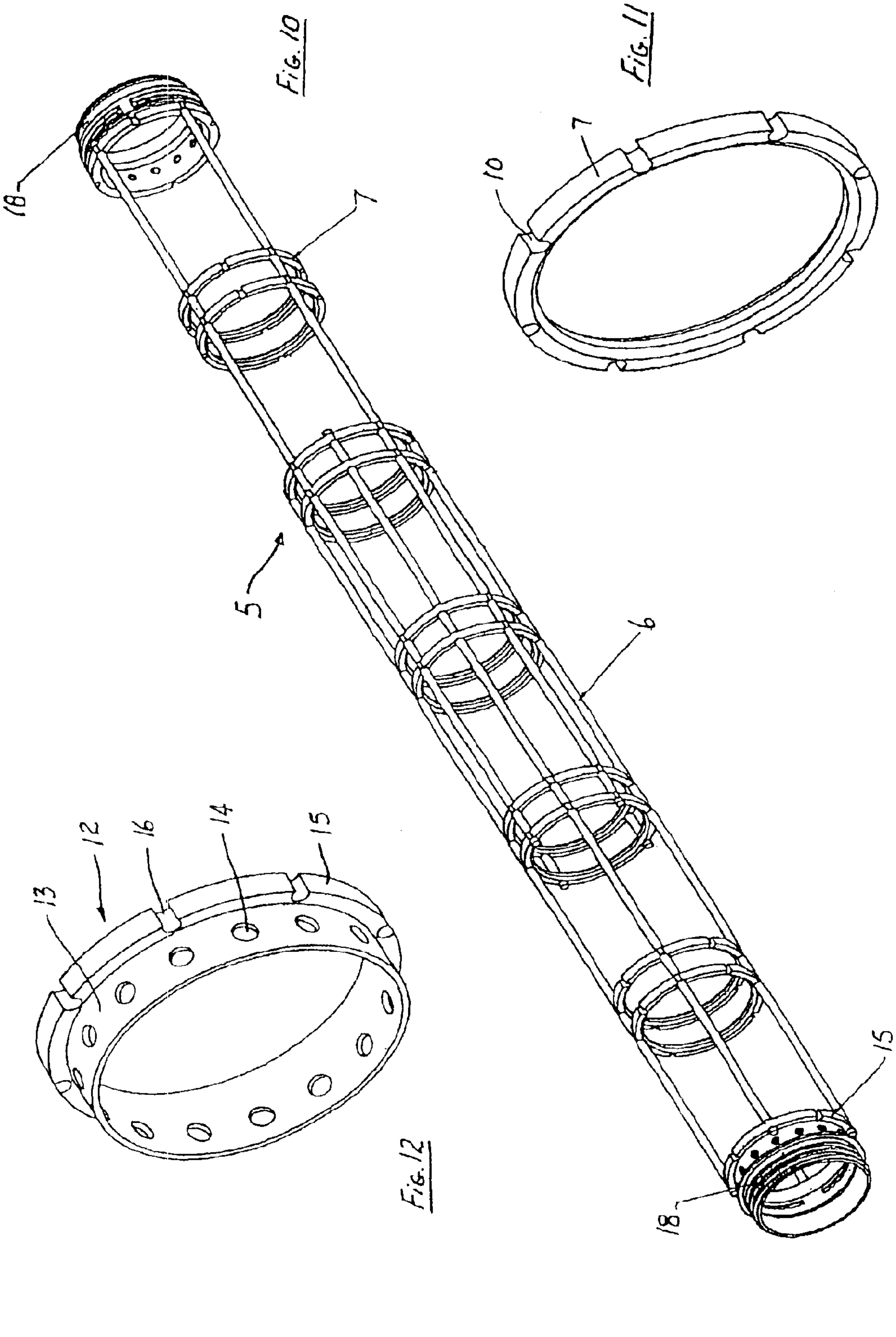
FIG. 10 shows a perspective view of the restraining system according to a fourth embodiment.
FIG. 11 shows a perspective view of the snap ring component of the restraining system of FIG. 10.
FIG. 12 shows a perspective view of the adaptor ring component of the restraining system of FIG. 10.
Figure 13:
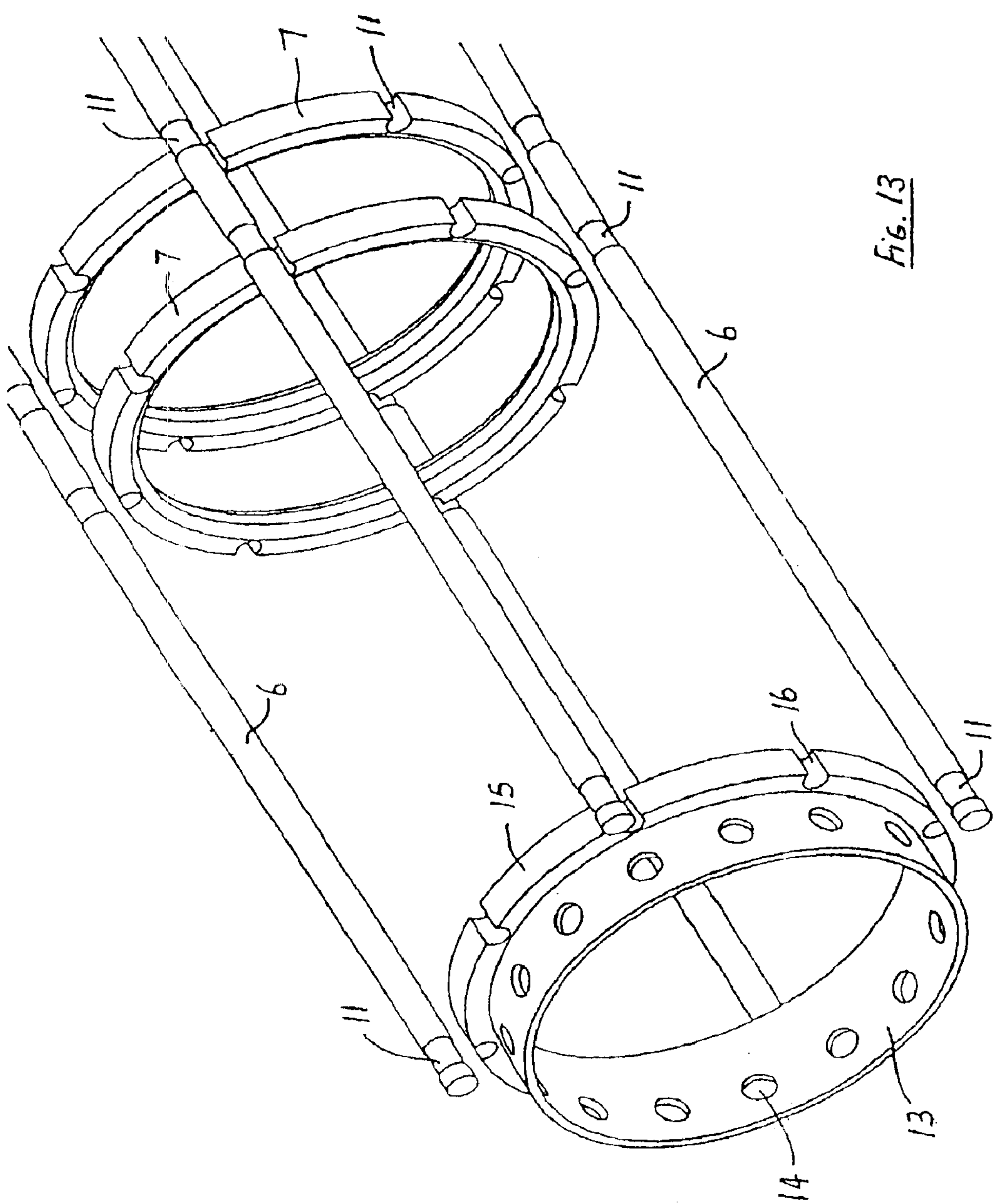
FIG. 13 shows an enlarged perspective view of the end of the restraining system of FIG. 4.

As shown in the various embodiments, the spacer rings 7 are preferably arranged in closely-spaced pairs. Further, the number of rods and rings can be varied according to restraint requirements. As best shown in FIG. 10, the density of rod numbers can also be varied along the length of the tubular structure 5 where restraint requirements vary along the length.

The restraining system is used to restrain a bundle of hollow fibre membranes employed in filtration systems. The fibre bundle extends longitudinally within the tubular restraining system. The restraining system allows fluid flow to and from the hollow fibre membranes. Typically, the fibres extend between upper and lower headers which, together with the restraining system, can be used to form a replaceable fibre bundle module. In such arrangements, the cage has the added advantage of protecting the fibre bundle during deployment of the module.

It will be appreciated, that further embodiments and exemplifications of the invention are possible without departing from the spirit or scope of the invention described.

What is claimed is:

1. A filtration system, said filtration system comprising a bundle of hollow fibres and a restraining system for the hollow fibres, said restraining system comprising a plurality of longitudinally extending elements spaced from one another and supported by a plurality of discrete spacer elements, said spacer elements extending generally transverse of said longitudinally extending elements, wherein said spacer elements and said longitudinally extending elements are arranged to define a cage-like structure, wherein the restraining system comprises a terminating adaptor ring, and wherein the terminating adaptor ring comprises an inner ring comprising a plurality of openings configured to allow passage of a fluid therethrough.

2. A filtration system according to claim 1, wherein the cage-like structure comprises a tubular shape.

3. A filtration system according to claim 1, wherein the longitudinally extending elements comprise rods and the spacer elements comprise rings.

4. A filtration system according to claim 3, wherein each ring comprises a plurality of radially extending cut-outs spaced around a periphery of the ring, each cut-out configured to provide an interference-fit or snap-fit with an associated rod.

5. A filtration system according to claim 4, wherein the cut-outs are equally-spaced around the periphery of the ring.

6. A filtration system according to claim 3, wherein each ring comprises a cushioning element, wherein the cushioning element is situated on the internal surface of the ring.

7. A filtration system according to claim 6, wherein the cushioning element extends past a length of the ring at both ends of the ring so as to overlap the internal edges of the ring.

8. A filtration system according to claim 7, wherein the cushioning element comprises a foam material.

9. A filtration system according to claim 1, wherein at least one of the longitudinally extending elements and the spacer elements comprises a generally rigid plastic material.

10. A filtration system according to claim 9, wherein the generally rigid plastic material comprises nylon or acrylonitrile butadiene styrene.

11. A filtration system according to claim 1, wherein at least one of the longitudinally extending elements and the spacer elements is a molded element.

12. A filtration system according to claim 1, wherein at least one of the longitudinally extending elements and the spacer elements is a machined element.

13. A filtration system according to claim 1, wherein the terminating adaptor ring is configured to mount the restraining system to a potting sleeve.

14. A filtration system, said filtration system comprising a bundle of hollow fibres and a restraining system for the hollow fibres, said restraining system comprising a plurality of longitudinally extending elements spaced from one another and supported by a plurality of discrete spacer elements, said spacer elements extending generally transverse of said longitudinally extending elements, wherein said spacer elements and said longitudinally extending elements are arranged to define a cage-like structure, wherein the restraining system comprises a terminating adaptor ring, and wherein the terminating adaptor ring comprises a radial extending circumferential rib.

15. A filtration system according to claim 14, wherein the radial extending circumferential rib comprises a plurality of cut-outs for engaging with the longitudinally extending elements.

16. A filtration system according to claim 15, wherein a number of cut-outs on the radial extending circumferential rib is the same as a number of cut-outs on at least one of the spacer elements.

17. A filtration system according to claim 1, wherein the spacer elements are arranged in closely-spaced pairs.

18. A filtration system according to claim 1, wherein a number density of longitudinally extending elements varies along a length of the cage-like structure.

19. A filtration system according to claim 14, wherein the cage-like structure comprises a tubular shape.

20. A filtration system according to claim 14, wherein the longitudinally extending elements comprise rods and the spacer elements comprise rings.

21. A filtration system according to claim 20, wherein each ring comprises a plurality of radially extending cut-outs spaced around a periphery of the ring, each cut-out configured to provide an interference-fit or snap-fit with an associated rod.

22. A filtration system according to claim 21, wherein the cut-outs are equally-spaced around the periphery of the ring.

23. A filtration system according to claim 20, wherein each ring comprises a cushioning element, wherein the cushioning element is situated on the internal surface of the ring.

24. A filtration system according to claim 23, wherein the cushioning element extends past a length of the ring at both ends of the ring so as to overlap the internal edges of the ring.

25. A filtration system according to claim 24, wherein the cushioning element comprises a foam material.

26. A filtration system according to claim 14, wherein at least one of the longitudinally extending elements and the spacer elements comprises a generally rigid plastic material.

27. A filtration system according to claim 26, wherein the generally rigid plastic material comprises nylon or acrylonitrile butadiene styrene.

28. A filtration system according to claim 14, wherein at least one of the longitudinally extending elements and the spacer elements is a molded element.

29. A filtration system according to claim 14, wherein at least one of the longitudinally extending elements and the spacer elements is a machined element.

30. A filtration system according to claim 29, wherein the terminating adaptor ring is configured to mount the restraining system to a potting sleeve.

31. A filtration system according to claim 14, wherein the spacer elements are arranged in closely-spaced pairs.

32. A filtration system according to claim 14, wherein a number density of longitudinally extending elements varies along a length of the cage-like structure.

* * * * *